(12) United States Patent
Yerushalmi et al.

(10) Patent No.: US 7,820,047 B2
(45) Date of Patent: Oct. 26, 2010

(54) INTEGRATED MULTI-ZONE WASTEWATER TREATMENT SYSTEM AND METHOD

(75) Inventors: Laleh Yerushalmi, Montreal (CA); Michael J. Ogilvie, Hatley (CA)

(73) Assignee: BioCAST Systems Inc., Montreal, Quebec (CA)

(*) Notice: Subject to any disclaimer, the term of this patent is extended or adjusted under 35 U.S.C. 154(b) by 659 days.

(21) Appl. No.: 11/576,763

(22) PCT Filed: Oct. 3, 2005

(86) PCT No.: PCT/CA2005/001510

§ 371 (c)(1), (2), (4) Date: Sep. 27, 2007

(87) PCT Pub. No.: WO2006/039786

PCT Pub. Date: Apr. 20, 2006

(65) Prior Publication Data

US 2008/0110828 A1 May 15, 2008

(30) Foreign Application Priority Data

Oct. 12, 2004 (CA) .................................. 2481853

(51) Int. Cl.
*C02F 3/00* (2006.01)
(52) U.S. Cl. .................... 210/615; 210/616; 210/617; 210/620; 210/621; 210/623; 210/629; 210/630; 210/906; 210/220
(58) Field of Classification Search ......... 210/615–617, 210/620, 621, 623, 629–630, 906, 220
See application file for complete search history.

(56) References Cited

U.S. PATENT DOCUMENTS

| | | | |
|---|---|---|---|
| 4,948,510 | A | 8/1990 | Todd et al. |
| 4,999,111 | A | 3/1991 | Williamson |
| 5,480,548 | A | 1/1996 | Daigger et al. |
| 5,518,618 | A | 5/1996 | Mulder et al. |
| 6,054,044 | A | 4/2000 | Hoffland et al. |
| 7,008,538 | B2 * | 3/2006 | Kasparian et al. ........... 210/610 |
| 2005/0040107 | A1 | 2/2005 | Kasparian et al. |
| 2006/0000769 | A1 * | 1/2006 | Miklos ....................... 210/605 |

* cited by examiner

*Primary Examiner*—Chester T Barry
(74) *Attorney, Agent, or Firm*—Marks & Clerk; Richard J. Mitchell (57) ABSTRACT

A wastewater treatment system has two separate but interlinked tanks containing four different zones, namely aerobic, microaerophilic, anoxic and anaerobic, for the biological treatment of the wastewater, as well as two clarification zones and a filtration unit for separation of solids from liquid. The first tank contains the aerobic, microaerophilic and anoxic zone as well as a clarification zone, while the second dank includes the anaerobic zone, a solid-liquid separation zone and a filtration unit. The aerobic zone is an airlift reactor that contains air diffusers at the bottom of the zone to introduce air into the zone. The air bubbles mix the liquid and its content of microorganisms, and provide oxygen for the aerobic biological processes that take place in this zone. Aeration also produces circulation of liquid between the aerobic zone and its adjacent microaerophilic and anoxic zones that are located at the sides and under the aerobic zone, respectively. The aerobic zone contains suspended microorganisms of heterotrophic and autotrophic groups that grow inside the circulating liquid, known as mixed liquor. Within the volume of the aerobic zone, loose carrier material or stationary objects are disposed to support the attachment of microbial biomass and the formation of microbial biofilm.

27 Claims, 8 Drawing Sheets

INTEGRATED MULTI-ZONE WASTEWATER TREATMENT SYSTEM AND METHOD

FIELD OF THE INVENTION

The method and apparatus of this invention relate to the treatment of a liquid or slurry of waste stream (e.g., wastewater or sludge) originated from municipal or industrial activities, or the treatment of groundwater or landfill leachate contaminated with organic and/or inorganic chemicals. The organic material may contain sources of BOD and COD as well as hazardous chemicals such as aromatic hydrocarbons, including benzene, toluene, ethylbenzene, xylenes, phenols, cresols, polycyclic aromatic hydrocarbons (PAHs), and halogenated (e.g., chlorinated) hydrocarbons, such as tetrachloroethylene, trichloroethylene, 1,1,1-trichloroethane and similar xenobiotics, and inorganic material notably nitrogen and phosphorus.

BACKGROUND OF THE INVENTION

The treatment of wastewater and contaminated groundwater require the removal of organic and inorganic contaminants, usually present in solid and/or dissolved form, before their discharge into the receiving waters. The organic contaminants include sources of COD/BOD such as proteins, lipids and polysaccharides as well as hazardous compounds such as aromatic and aliphatic hydrocarbons. Examples of the latter group include gasoline and diesel fuel, polycyclic aromatic hydrocarbons, phenols, chlorophenols, alkylated benzenes, tetrachloroethylene (PCE) and trichloroethylene (TCE). The nitrogenous and phosphorus compounds, which are among the most undesirable inorganic contaminants of wastewater and contaminated groundwater, also need to be removed during the treatment process.

Biological treatment processes use a variety of microorganisms such as bacteria, protozoa and metazoa for an efficient and complete biodegradation of contaminating compounds in wastewater and contaminated groundwater and landfill leachates. The removal of carbonaceous, nitrogenous and phosphorus-containing compounds is carried out by bacteria, whereas protozoa and metazoa mostly contribute to the reduction of turbidity since they graze on bacteria as a food source. The organic charge in the wastewater is often measured by chemical oxygen demand (COD) or biochemical oxygen demand (BOD). These parameters define the overall oxygen load that a wastewater will impose on the receiving water. During biological treatment processes, organic substances are removed since these substances serve as the source of carbon in the microbial metabolism. Nitrogen and phosphorus are also consumed by microorganisms as essential nutrients to support microbial growth during assimilatory processes, while excess amounts of nitrogenous compounds is removed during dissimilatory microbial nitrogen metabolism where they are transformed to molecular nitrogen and released into the atmosphere. The remaining phosphorus may be removed by the "luxury phosphorus uptake" process where special groups of microorganisms accumulate phosphorus and store it as poly-phosphorus compounds, thus removing it from the system during sludge disposal.

Nitrogen and phosphorus have been recognized as major contributors to eutrophication, a process that supports the growth of algae and other undesirable organisms in the receiving waters and diminishes the concentration of dissolved oxygen, thus threatening aquatic life. Therefore, stringent criteria have been introduced demanding the reduction of these nutrients below certain levels that are established by environmental agencies, before the effluent of treatment plants can be safely disposed to the receiving waters.

In general, the success of biological treatment systems depends on the concentration of biomass and the mean cell residence time (MCRT), as well as the ability of treatment system to separate sludge from the treated liquid. These parameters control the efficiency of treatment and the quality of effluent. Suspended-growth biological treatment systems that are based on activated sludge processes have difficulties in maintaining an adequate concentration of active biomass, and to effectively separate solids from liquid. They also produce large amounts of sludge and have a slow adaptation to fluctuating influent conditions. These problems have been addressed in the design of fixed-film treatment systems that use attached microbial biomass, immobilized on a support material. The immobilized cells grow and produce microbial biofilm, containing a consortium of microorganisms that changes with time and within the thickness of the biofilm. Fixed-film systems can operate in aerobic, anoxic or anaerobic modes depending on the nature of the contaminating compounds. These systems offer microbial diversity and prevent the washout of biomass. They also offer a higher MCRT and ease of operation relative to the separation of biomass from liquid. However, fixed-film systems have a lower rate of contaminant removal compared to suspended-growth treatment systems since the rate of removal in these systems is controlled by mass transfer and diffusion within the microbial biofilm. Aerobic fixed-film systems treating high organic concentrations have a limited capacity because of oxygen transfer limitations. Moreover, the build-up of a thick and heavy biofilm, resulting from high concentrations of organic substances may cause clogging, seriously disrupting the operation of the treatment system. Therefore, fixed-film systems have a limited application in the treatment of high organic load wastewaters. Another disadvantage of fixed-film treatment systems is that they usually operate in plug-flow mode and do not offer the homogenous environment provided by completely mixed reactors. In these systems, there is a high concentration of contaminants at the influent end of the reactor and the microorganisms will be subjected to the full concentration of contaminants that may be toxic.

All of the technologies discussed above were originally designed for secondary treatment, i.e. removal of carbonaceous compounds and solid-liquid separation and not to remove nutrients, notably nitrogenous and phosphorus compounds or halogenic substances from wastewater or contaminated groundwater and landfill leachate that require the presence of different environments with different levels of dissolved oxygen concentration and oxidation-reduction potential. These technologies also cannot stabilize the produced sludge and need supplementary vessels for this process.

In order to meet stringent discharge criteria including nitrogen and phosphorus removal, wastewater treatment plants usually upgrade their performance by using add-on technologies such as biological nutrient removal (BNR) systems. The theories of biological nitrogen and phosphorus removal mechanisms demonstrate that nitrogen removal needs the presence of aerobic and anoxic environments, while the removal of phosphorus demands the presence of anaerobic and aerobic environments in the treatment system.

Conventional wastewater treatment technologies, originally developed for the removal of carbonaceous compounds (BOD) and suspended solids, accommodate nutrient removal by providing additional aerated, anoxic or anaerobic units in series, along with various internal recycle streams to achieve the required removal of nitrogen and/or phosphorus. These modifications have increased the complexity of the treatment systems and complicated their proper design and optimization. Nitrification, the first step in the biological nitrogen removal mechanism that involves the conversion of ammonia nitrogen to nitrate nitrogen, requires an aerobic environment and is achieved in all aerobic reactors if the right operating conditions such as the liquid pH, carbonate concentration, and sludge retention time exist. Denitrification, i.e. the transformation of nitrate nitrogen to molecular nitrogen, can be accomplished by the addition of an anoxic activated sludge reactor or fixed-film system. An easily degradable carbon source must be present for the denitrification process. If the treatment system cannot supply the required carbon source, then methanol, ethanol, acetic acid or a different compound must be added. In these combined processes, the wastewater or contaminated groundwater is first fed into the anoxic denitrification reactor. The effluent from the anoxic reactor is fed into the aerobic reactor. A sufficient retention time in the aerobic reactor is needed to ensure a complete oxidation of carbonaceous compounds as well as adequate growth and proliferation of slow-growing nitrifiers to carry out the nitrification process and convert ammonia-nitrogen to nitrate-nitrogen. Sequencing batch reactor (SBR) systems have been used for biological nitrogen removal by incorporating anoxic-aerobic sequencing bioreactors. Instead of using an external carbon source for denitrification, it is quite possible to design a nitrification-denitrification system that uses the carbon present in the raw wastewater as well as the carbon released from the endogenous respiration of microbial sludge. In these systems, nitrification and denitrification occur in a singe vessel with alternating aerobic and anoxic zones. Alternatively, aerobic and anoxic zones may be present in separate vessels positioned in series. Sufficient recycle is required to prevent the effluent from containing excessive ammonia concentrations. Several systems have been developed along with these design elements. The two most successful have been the denitrifying oxidation ditch and the Bardenpho process.

In the denitrifying oxidation ditch, an anoxic zone is added inside the aerobic reactor. The influent is added to the anoxic zone and the effluent is withdrawn from the aerobic reactor. Solids are then separated from the liquid by settling in a clarifier. One of the most common design modifications for enhanced nitrogen removal is known as the Modified Ludzack-Ettinger (MLE) process. In this process, an anoxic tank is added upstream of the oxidation ditch along with mixed liquor recirculation from the aerobic zone to the tank to achieve higher levels of denitrification.

Another variation of aerobic/anoxic systems for nitrification/denitrification is the four stage Bardenpho process that has two aerobic and two anoxic vessels. Carbon from the untreated wastewater and from endogenous decay of microorganisms is used for denitrification by returning the aerobically treated wastewater to the initial anoxic zone.

In order to achieve phosphorus removal as well as nitrogen removal, the incorporation of an additional anaerobic zone in the treatment system is necessary. Two such configurations are the A2/O process and the five-stage Bardenpho process. The A2/O system includes anaerobic, anoxic and aerobic zones. In this process, the untreated wastewater is first added to the anaerobic zone where soluble phosphorus is released and VFAs are uptaken by the phosphorus accumulating microorganisms (PAOs). The effluent of the anaerobic tank is fed into the anoxic zone for the reduction of nitrate and its conversion to nitrogen. The effluent of the anoxic zone flows to the aerobic zone for BOD removal and nitrification. The separation of solids and liquid takes place in a clarifier. Two recycle streams are present in this process: one from the clarifier to the anaerobic zone to return a portion of the separated sludge, and the second one from the aerobic to the anoxic zone carrying nitrate for the denitrification process. The ability of the A2/O process to provide anaerobic dehalogenation has raised interest in this process for the treatment of groundwater and landfill leachate contaminated with hazardous chemicals such as chlorinated aliphatic compounds, recognized as common contaminants of soil and groundwater around the world.

In the Bardenpho system, there are two aerobic and two anoxic zones. Similar to the A2/O process, there are also two recycle streams between the clarifier and the anaerobic zone, and between the first aerobic and anoxic zones. In this configuration, a more complete removal of nitrogen is achieved. Moreover, the anaerobic zone will not receive nitrate in the recycle stream, thus a better phosphorus removal process can also take place. The five-stage Bardenpho process has a high nutrient removal capacity and can remove high concentrations of nitrogen and phosphorus from wastewater and contaminated groundwater.

As learned from the above description, most conventional nutrient removal systems are multi-vessel/multi-zone processes that have complicated designs and large footprints, and require high operator attention and maintenance requirements.

An alternative nutrient-removal, wastewater treatment technology that uses a multi-zone system with different environmental conditions is the Integrated Biologically Active Clarifier (IBAC). This technology that is currently in commercial operation in Quebec, Canada, combines biological treatment, solid-liquid separation and sludge stabilization in a single vessel. This treatment system has three vertically-stacked biological zones having aerobic, anoxic and anaerobic environments as well as a clarification zone. The vertical stacking of the treatment zones causes the settlement of heavy solid material including high-density biological flocs to the anaerobic zone that is located at the bottom of the reactor where anaerobic biodegradation occurs. The system does not use any recycle streams either for sludge or mixed liquor. The mixing and liquid recirculation is provided by the introduction of air into the aerobic zone. This technology suffers from a series of problems that seriously upset the operation of the treatment system. They include the periodic rise of sludge in the clarification zone due to excessive gas production in the bottom anaerobic zone, inconsistent nutrient removal, and poor settleability of solids. In addition, this technology does not permit proper control and optimization of the biological treatment and solid-liquid separation processes due to the occurrence of all different processes in a single vessel and the existing interactions among them.

Several wastewater and groundwater treatment technologies for the removal of organic carbon and nutrients are described in the patent literature. Examples of techniques dealing with the removal of carbonaceous material, nitrogen and/or phosphorus form wastewater can be found in U.S. Pat. Nos. 4,488,968; 4,948,510; 5,128,040; 5,160,043; 5,288,405; 5,518,618; 5,601,719; 5,651,891; 5,972,219; 6,139,743; 6,372,138; and 6,413,427.

U.S. Pat. No. 5,518,618 relates to a system for the treatment of nitrogenous wastewater by biological nitrification and denitrification, wherein the wastewater along with microorganisms immobilized on a carrier material flow alternately in a downward flow in an oxygen-depleted chamber and in an upward flow in an oxygen-rich chamber. The aerated reactor chamber may be partly divided into a riser and a downcomer which allow, as a result of the air supply, mass circulation to take place in this chamber. The oxygen-depleted reactor chamber contains a degassing chamber and a settling chamber at the top in order to separate the liquid from the solid sludge. The aerated chamber is supplied with a gas delivery system for producing an upward flow of waste water and a gas discharge located above it. The aerated chamber is also supplied at the top with an overflow to the oxygen-depleted reactor chamber. This treatment system does not have any anaerobic zone to promote phosphorus removal and does not stabilize sludge.

U.S. Pat. No. 6,139,743 relates to a suspended-growth treatment system that includes a multiplicity of tanks, some with several compartments, including an anaerobic/anoxic reaction tank, an aeration tank and a settling tank. The settled sludge is further returned into the anaerobic compartment. The treatment system is capable of reducing the carbon, nitrogen and phosphorus compounds in the wastewater. However, it requires that an external carbon source be provided to each compartment of the anaerobic/anoxic reaction tank to support the nitrogen and phosphorus removal processes. This practice adds to the operational cost of treatment. The treatment system has a large footprint that requires large areas for its setup and operation. Like other suspended-growth treatment technologies, there is also a high production of sludge and an associated high cost for its disposal.

U.S. Pat. Nos. 5,128,040 and 5,651,891 use a series of aerobic and anoxic/anaerobic tanks for the removal of BOD, improvement of solid settleability and reduction of nitrogen and phosphorus in wastewater. Suspended-growth processes, e.g. activated sludge, or attached-growth processes, e.g. trickling filter or rotating biological contactor may be used for BOD reduction and nitrification in these treatment systems. One of the specifications teaches the use of two fermentation tanks for the production of VFAs, required in the denitrification and phosphorus removal process, and its return to the anoxic/anaerobic tank. These inventions improve the efficiency of solids removal in trickling filter/solids contact processes. However, they have a limited phosphorus removal capacity, use a multiplicity of tanks, need a very large area for operation and have several recycle streams, considerably increasing their complexity, maintenance requirement and cost of operation.

U.S. Pat. No. 5,601,719 discusses a similar treatment system for the removal of BOD, nitrogen and phosphorus from wastewater containing a series of aerobic, anoxic and anaerobic vessels, a sludge fermenter, a secondary clarifier, and a supplemental substrate source with several recycle streams. The inclusion of an anaerobic fermentation stage in the treatment process has also been discussed in several other specifications such as U.S. Pat. Nos. 4,999,111, 5,013,441, and 4,874,519.

U.S. Pat. No. 5,480,548 relates to a step feed activated sludge process including anaerobic-anoxic-aerobic zones for biological nitrogen and phosphorus removal. The system contains multiple step feed points arranged in a series of consecutive treatment stages and a series of recycle lines carrying the effluents of anoxic and anaerobic zones as well as the return activated sludge to different zones. The system is purported to achieve reductions of phosphorous and ammonia greater than 90% and 97%, respectively, and a 50% reduction in total nitrogen.

U.S. Pat. No. 4,056,465 relates to a modified activated sludge system where BOD-containing wastewater and recycled sludge are initially mixed under anaerobic conditions and in the absence of nitrate or nitrite thereby promoting the production of the desired type of microorganisms. The effluent of this stage is then sent to an aerobic tank where BOD removal, phosphorus uptake and nitrification take place. Nitrates and nitrites are removed by interposing an anoxic treating zone between the anaerobic zone and the aerating zone.

U.S. Pat. No. 4,948,510 describes a process containing a plurality of basins which may be individually controlled to achieve anaerobic, anoxic or aerobic conditions. The basins are reconfigurable in that the flow of effluent to a basin, transfer of mix liquor between basins and effluent discharge from a basin can be varied to create a treatment cycle which has features of both continuous and batch processes while minimizing recycle rates and hydraulic level changes.

U.S. Pat. No. 6,063,273 discloses an apparatus for the biological purification of wastewater, the apparatus having a column containing an upflow anaerobic sludge bioreactor (UASB) at the bottom and an aerobic reactor at the top. The two reactors are separated from one another by a partition in which openings are provided to allow the anaerobic effluent through into the aerobic reactor. The partition forms a buffer zone preventing the biomass from the anaerobic zone to mix with the biomass from the aerobic zone.

Several other treatment technologies, mostly based on activated sludge processes; using multi-vessel or multi-zone aerobic/anoxic/anaerobic systems for the complete or partial removal of nitrogen and phosphorus from municipal or industrial effluents have been reported. Examples of such technologies are found in U.S. Pat. Nos. 4,056,465; 4,271,026; 4,488,967; 4,500,429; 4,522,722; 4,948,510; and 5,137,636.

Examples of treatment systems and apparatus for groundwater and landfill leachate contaminated with hazardous material have been discussed in U.S. Pat. Nos. 4,290,894; 4,442,005; 5,080,782; 5,389,248; 5,413,713; 5,578,202; 5,766,476; 5,804,432; 5,922,204; 6,159,365; and 6,461,509.

U.S. Pat. No. 5,922,204 discusses a treatment system containing a plurality of reactors connected in series. By means of process kinetics control, the treatment system accomplishes biological denitrification and metal precipitation in the first reactor followed by biological sulfate reduction and the production of saturated and unsaturated hydrocarbons in the second reactor, followed by methanogenesis and finally aerobic respiration in the final reactor.

U.S. Pat. No. 5,413,713 discloses a method for increasing the rate of anaerobic bioremediation in a bioreactor by recirculating to the bioreactor a given portion of a pollution stream that has flowed through a passageway containing material on whose surface anaerobic microorganisms can attach or become immobilized. The flow rate of recirculating liquid is adjusted to the level that it would slough from the surface and return to the stream at least a portion of the attached or immobilized microorganisms from the surface.

U.S. Pat. No. 5,080,782 relates to a bioremediation vessel containing a gas injection system, a nutrient addition system, and a continuously regenerating culture of microorganisms which biodegrade hazardous substances. The bioremediation vessel contains a support material for the immobilization of microorganisms while a fraction of microorganisms slough off the support medium and disperse into the treated ground water.

U.S. Pat. No. 6,461,509 discusses a treatment system that uses an aerobic packed-bed bioreactor to degrade organic material in the contaminated water. An additive consisting of at least one of a vegetable extract and a nutrient medium, is added to the contaminated water immediately before entering the packed bed to stimulate the production of exo-enzymes by the bacteria.

U.S. Pat. No. 5,578,202 relates to a water processing system for processing highly contaminated water that has a plurality of processing chambers defined by partition walls. The system comprises an anaerobic chamber, an aerobic chamber, a buffering chamber, and a recycle for recycling part of the water received in the buffering chamber back to the anaerobic chamber, and a filter material forming a buoyant filter layer in an upper part of the water received in the anaerobic chamber. The filter layer can be highly resistant against clogging, and can be easily maintained with the result that the overall system can be made both simple and economical.

U.S. Pat. No. 6,159,365 discusses an encased packaged modular type unit for treatment of contaminated water comprising a separation compartment to separate solids and, if present, oil and grease in contaminated water, a fluidized bed reactor assembly containing aeration zone(s), internal recirculation zone(s), clear effluent zone(s), and mixing/degassing zone(s). The fluidized bed contains suspended viable biomass, a physico-chemical reagent or a mixture of both biomass and physico-chemical reagent for the removal of contaminating compounds, and a compartment wherein excess sludge is thickened and removed.

Most of prior art solutions suffer from complicated designs, high maintenance requirements or large footprints as well as a limited capacity to address the treatment of groundwater or landfill leachate contaminated with a mixture of contaminating compounds of organic and inorganic nature. Examples of such contaminations include mixtures of hydrocarbons (e.g. diesel fuel, jet fuel or gasoline) with nitrate and phosphorus, commonly resulting from the combined agricultural and airport or military activities. Other examples include mixtures of aromatic hydrocarbons and halogenated hydrocarbons (e.g. PCE and TCE), and sometimes metals. These kinds of contaminations require the simultaneous presence in the treatment system of diversified groups of microorganisms as well as different environmental conditions including different levels of dissolved oxygen concentration and redox potential for their complete treatment. Provisions have to be made for adequate biomass growth and maintenance of all different microbial groups, effective solid-liquid separation, sludge stabilization, and proper optimization and control of environmental conditions in the multiple zones of the treatment system.

SUMMARY OF THE INVENTION

It is an object of the invention to provide a wastewater treatment apparatus capable of efficiently removing organic contaminants as well as suspended solids and inorganic contaminants, notably nitrogen and phosphorus, from wastewater and contaminated groundwater.

It is another object of the present invention to provide a treatment method for efficiently removing suspended solids and organic material as well as some inorganic contaminants notably nitrogen and phosphorus contained in wastewater and contaminated groundwater and to maintain low solids generation in comparison with flow-through treatment systems or those having sludge re-circulation.

In accordance with one aspect of the invention, there is provided a wastewater treatment system comprising a first processing vessel having a wastewater inlet, the vessel comprising an aerobic zone, at least one oxygen-depleted zone in fluid communication with the aerobic zone, and a first clarification zone in fluid communication with the at least one oxygen-depleted zone, wherein the aerobic zone comprises aeration means for supplying air or oxygen to the aeration zone and disposed so that operation of the aeration means causes recycling of wastewater between the aeration zone and the at least one oxygen depleted zone, a second processing vessel comprising an anaerobic zone in a lower part thereof, a first passage and pump means communicating the at least one oxygen-depleted zone with the anaerobic zone, and an outlet for processed wastewater.

In accordance with another aspect of the invention, there is provided a wastewater purification process comprising the steps of:

feeding wastewater into a first processing vessel having an aerobic zone, a microaerophilic zone and an anoxic zone, providing aerobic conditions in said aerobic zone so that the wastewater circulates between the aerobic zone, the microaerophilic zone and the anoxic zone, providing solid support for microbial biomass in said aerobic zone, feeding part of content of the anoxic zone to an anaerobic zone in a second processing vessel for sludge present in the content to settle in the anaerobic zone, removing effluent from the first processing vessel and removing the sludge settled in the anaerobic zone.

In one embodiment, the apparatus of the invention has two separate but interlinked tanks containing four different zones, namely aerobic, microaerophilic, anoxic and anaerobic, for the biological treatment, as well as two clarification zones and a filtration unit for separation of solids from liquid. The interconnected microaerophilic and anoxic zones are also termed oxygen-depleted zones. The aerobic zone is an airlift reactor that contains air diffusers at the bottom of the zone to introduce air into the zone. The air bubbles mix the liquid and its content of microorganisms, and provide oxygen for the aerobic biological processes that take place in this zone. Aeration also produces circulation of liquid between the aerobic zone and its adjacent microaerophilic and anoxic zones that are located at the sides and under the aerobic zone, respectively. The aerobic zone contains suspended microorganisms of heterotrophic and autotrophic groups that grow inside the circulating liquid, known as mixed liquor. A part of or the complete volume of the aerobic zone also contains loose carrier material or stationary objects to support the attachment of microbial biomass and the formation of microbial biofilm. The walls of the zone are not considered "stationary objects" for attachment of microbial biomass. Thus, the aerobic zone contains both suspended-growth and attached-growth microbial biomass. Most of the organic carbonaceous contaminants are removed in this zone. The nitrification process, a part of the biological nitrogen removal process, also takes place in the aerobic zone. The microaerophilic and anoxic zones are employed for the denitrification processes to transform the nitrogenous compounds into nitrogen gas and to completely remove nitrogen. The anaerobic zone along with the aerobic, microaerophilic and anoxic zones are employed for the removal of phosphorus compounds. Dispersed microbial biomass and light bioflocs accumulate inside the circulating mixed liquor while heavier bioflocs and solid waste material precipitate to the bottom of anoxic zone. A fraction of particulate organic matter entrapped in the bioflocs is hydrolyzed in the anoxic zone while the rest of it is transferred to the anaerobic zone. In the anaerobic zone, the solids are digested and transformed by fermentative bacteria during the fermentation processes to short-chain volatile fatty acids or VFAs. The VFAs are returned to the aerobic zone by a recycle stream between the anaerobic and the microaerophilic zones, providing easily degradable carbon source for the denitrification process. The recycle stream from the anaerobic to microaerophilic zone also carries microorganisms including phosphorus accumulating microbes or PAOs that carry out the removal of phosphorus by the luxury phosphorus removal process. The influent wastewater continuously circulates between the aerobic, microaerophilic and anoxic zones exposing the contaminants to three different environments that are necessary for a complete treatment of the contaminated water. The circulation of liquid causes the accumulation of suspended microbial biomass and light biological flocs inside the mixed liquor, increasing the mean cell residence time (MCRT) and enhancing microbial adaptation to the variations of influent wastewater and contaminated groundwater characteristics, including the concentration of contaminants and the incoming flow rate, as well as possible toxic shocks. The accumulation and further adaptation of microorganisms, both in the suspended and attached form, increases the specific as well as the volumetric rates of contaminant biodegradation, producing a high rate treatment. Liquid circulation between the three zones also prevents the accumulation of nitrates or nitrites that are produced in the aerobic zone and may inhibit microbial activities.

The wastewater treatment system of current invention enables the control of biomass retention time (MCRT) at a level that can, maximize microbial physiological activities while improving solids settleability. Compared to the conventional technologies, the present system is expected to produce considerably less biological solids or sludge, thus reducing the associated costs of solids handling and disposal.

The solid materials are separated from liquid by precipitation in two clarification zones. The colloidal materials as well as any additional suspended solids are retained in the filtration unit creating a treated liquid to emerge from the treatment system. The treatment system is more compact and uses less space compared to most conventional technologies.

BRIEF DESCRIPTION OF THE DRAWINGS

The invention will be described in more detail in the following description in conjunction with the drawings in which like numerals denote like elements and in which.

DETAILED DESCRIPTION OF THE INVENTION

As stated above, the treatment system of the present invention uses two separate but interlinked tanks for the biological treatment and solid-liquid separation processes. The first tank contains an aerobic zone, microaerophilic and anoxic zone plus a clarification zone. The second tank contains an anaerobic zone, a solid-liquid separation zone and a filtration unit. An example of the treatment system according to the invention is presented in FIG. 1.

It will be noted that in the embodiments described herein, the anaerobic zone is disposed in a different vessel than the aerobic zone and the oxygen-depleted zone(s).

Figure 1:
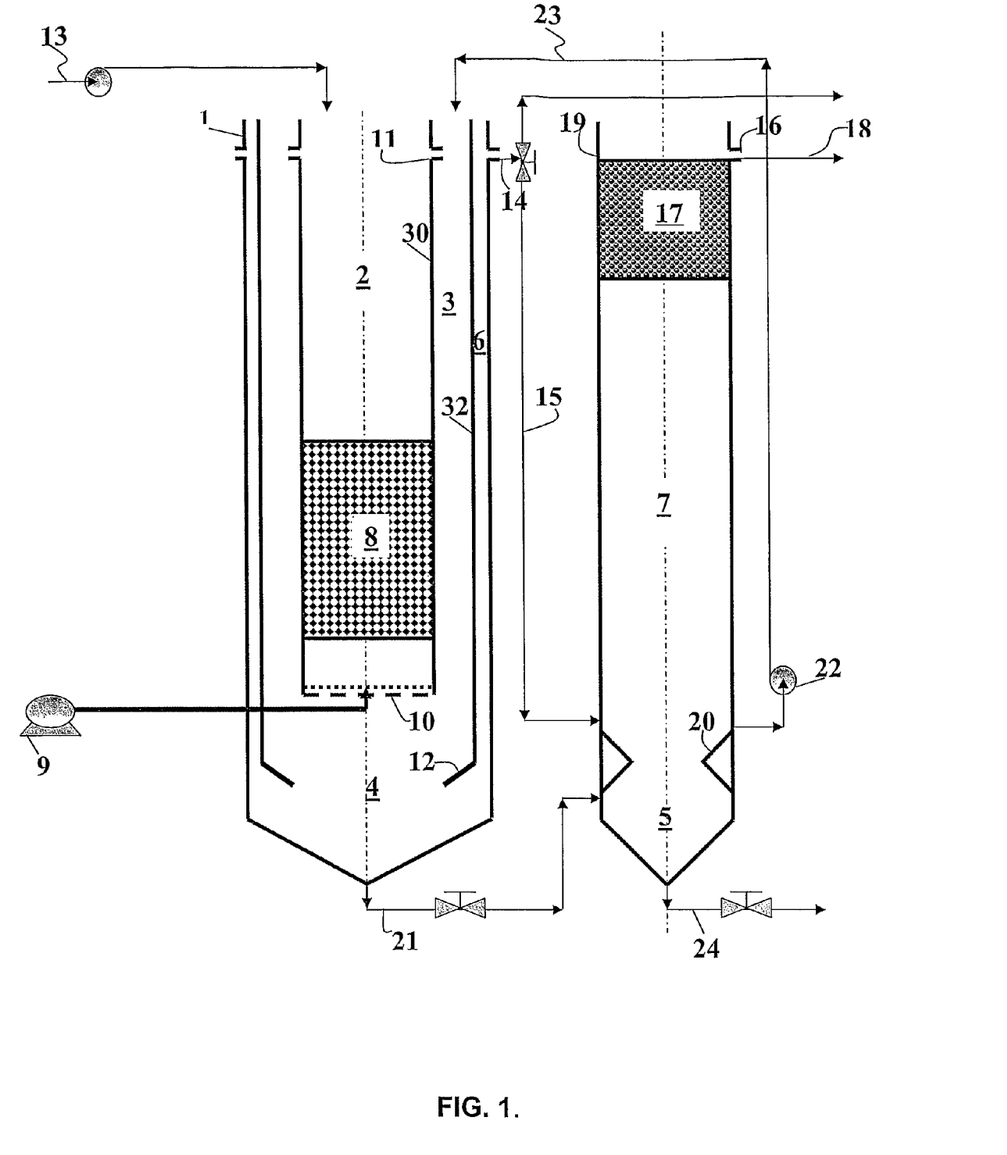
FIG. 1 represents schematically an exemplary wastewater treatment system of the invention.

The wastewater is introduced into the first tank 1 containing an aerobic zone 2, microaerophilic zone 3 and anoxic zone 4. The separation of solids from liquid takes place in two clarification zones 6 and 7, the first zone 6 attached to the microaerophilic zone 3, and the second zone 7 located in the second tank 19 disposed downstream of the first tank 1 and separated therefrom.

The biological treatment takes place in the four interactive zones, namely aerobic 2, microaerophilic 3, anoxic 4 and anaerobic zone 5 that support the multiplicity of biological processes required for the removal of organic and inorganic pollutants of wastewaters, wastewater solids and contaminated groundwater.

The microaerophilic zone and the anoxic zone are considered, jointly, as an oxygen-depleted zone.

The four zones are defined by their respective average concentrations of dissolved oxygen (DO) and oxidation-reduction (redox) potential (ORP). The DO concentration is highest in the aerobic zone 2 and is usually kept greater than 2 mg/L while the ORP is greater than +200 mv. In the microaerophilic zone 3, the DO concentration is in the range of 0-1 mg/L and the ORP is in the range of 0 to +200 mv. The DO concentration in the anoxic zone 4 is not detectable by commercial electrodes which read a steady zero concentration while the ORP ranges from −100 to +100 mv. However, the anoxic zone 4 may contain traces of oxygen. The anaerobic zone 5 practically does not contain any oxygen with a steady DO concentration of zero and an ORP of −300 to −100 mv. Conventional anaerobic zones or chambers may have ORP values below −300 mv to promote methanogenesis processes for the formation of methane gas. However, the formation of these conditions is prevented in the treatment system of the present invention in order to prevent the transformation of volatile fatty acids to methane. Volatile fatty acids are needed in the treatment system of the present invention to serve as carbon source for the denitrification process that takes place in the microaerophilic zone 3 and anoxic zone 4, and also as a source of carbon and energy for the phosphorus accumulating organisms during the phosphorus removal process.

Figure 2:
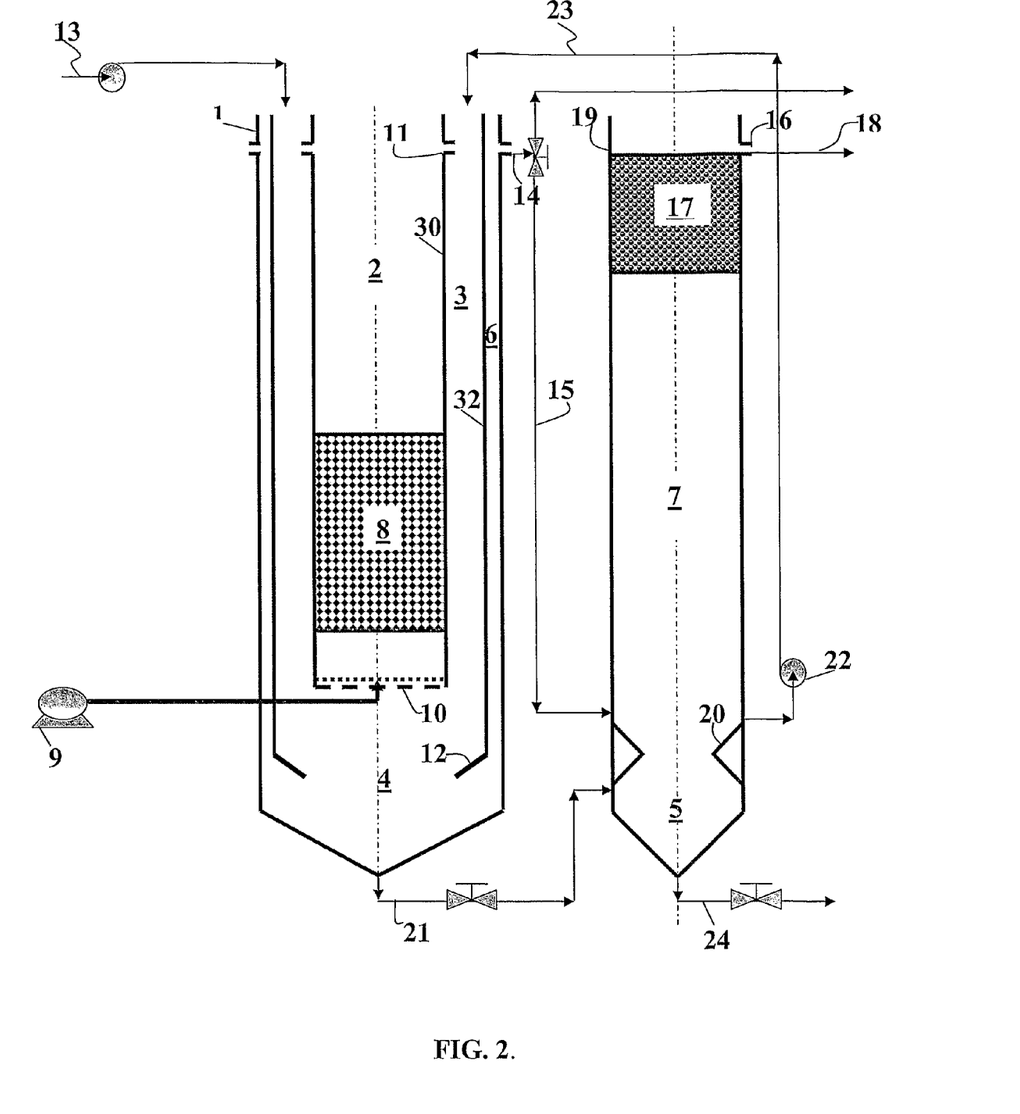
FIG. 2 represents schematically another embodiment of a wastewater treatment system of the invention.

The aerobic zone 2 is exemplified in FIG. 1 as an airlift reactor that uses compressed air produced by a commercial air compressor 9, to introduce air bubbles in the aerobic zone 2 and to raise the mixture of liquid (i.e. wastewater or contaminated groundwater or landfill leachate) and solids in this zone. The influent wastewater is introduced into the treatment system at the top of the aerobic zone 2. In an alternative embodiment of the invention, the wastewater can be introduced into the treatment system at the top of the microaerophilic zone 3 as illustrated in FIG. 2. Aeration by the introduction of compressed air achieves the following objectives: supply of oxygen to the microorganisms for the aerobic processes that take place in the aerobic zone 2; mixing of liquid and solids in the aerobic zone and generation of a homogeneous environment thus enhancing the mass transfer of oxygen, nutrients and intermediate metabolites across the cellular membrane; and circulation of mixed liquor between the aerobic, microaerophilic and anoxic zones. This tends to reduce, compared to the prior art, the number of pumps and recycle streams in the treatment system of the present invention. The compressed air is introduced in the treatment system through air diffusers 10 located at the bottom of the aerobic zone 2. The upward flow of liquid in the aerobic zone carries the suspended solids and flows towards the adjacent microaerophilic zone 3 through the gates 11 located at the top of a cylindrical partition wall 30 separating the aerobic zone 2 from the microaerophilic zone 3. The mixture of liquid and suspended solids including dispersed microorganisms, bioflocs or other solid organic, inorganic or inert material, known as the mixed liquor, flows downward in the microaerophilic zone 3 and passes through the anoxic zone 4 that is located at the bottom of the tank 1 and under the aerobic zone 2. The clarification zone 6 is disposed concentrically relative to the microaerophilic zone 3 and separated therefrom by a cylindrical wall 32 leaving channels for the passage of liquid at the bottom of the wall.

Figure 3:
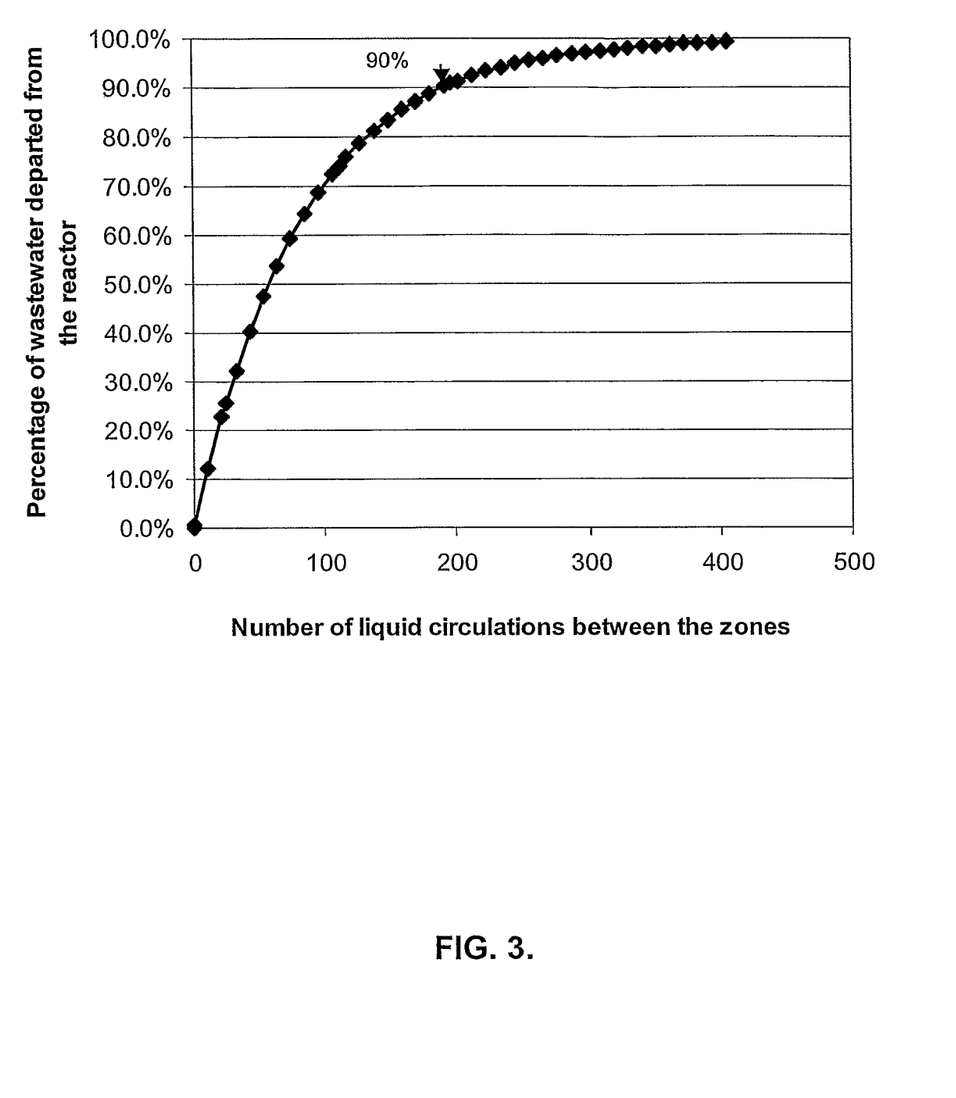
FIG. 3 illustrates a relationship between the percentage of wastewater departed from the system and the number of liquid circulations between the aerobic, microaerophilic and anoxic zones.
Figure 4:
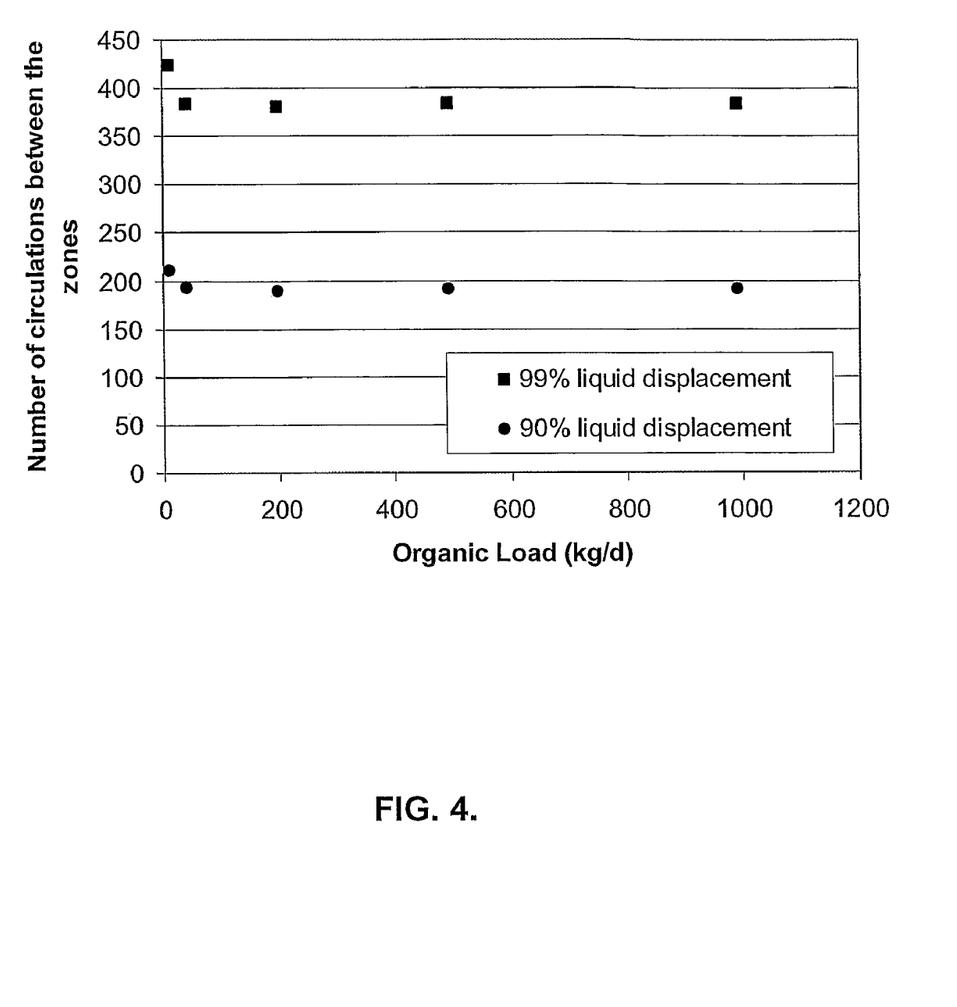
FIG. 4 illustrates a relationship between the number of liquid circulations between the zones as in FIG. 3 and the wastewater organic load for 90% and 99% displacement.

The action of air compressor 9 creates pressure difference across the air diffusers 10 and directs the flow of mixed liquor towards the aerobic zone, thus creating a continuously circulating liquid between the aerobic, microaerophilic and anoxic zones. The flow pattern of mixed liquor in the anoxic zone is further controlled by the design of baffles 12 in this zone that are attached to the dividing wall 32 between the microaerophilic zone 3 and clarification zone 6. The baffles direct the mixed liquor towards the centrally-located aerobic zone 2 while reducing fluid turbulence at the entrance of the clarification zone 6. The baffles 12 make an angle ranging from 30 to 90 degrees with a horizontal line. The resulting circulation exposes the contaminating compounds in the mixed liquor to three different environments, i.e. aerobic, microaerophilic and anoxic during each cycle, ensuring a high biodegradation rate of organic material as well as nitrification and denitrification and phosphorus accumulation by a diverse group of microorganisms. Mixed liquor circulates about 200 times between the three zones before a quantity greater than 90% of its original liquid leaves the system, as presented in FIG. 3. In fact, for 99% liquid discharge from the treatment system, the number of liquid circulations between the three zones varies in the narrow range of 375 to 425 turns regardless of the organic load, as presented in FIG. 4. The continuous circulation of mixed liquor is meant to achieve the following:

- Accumulation of microbial biomass in the mixed liquor, producing a high biomass concentration and a high mean cell residence time (MCRT) or solids retention time (SRT).
- Repeated exposure of mixed liquor to aerobic, microaerophilic and anoxic zones thus conditioning the wastewater and improving solids settleability while controlling the growth of filamentous microorganisms.
- Increase of the specific and volumetric rates of biodegradation of contaminating substances due to the accumulation of microbial biomass in the mixed liquor and its increased concentration and adaptation.
- Partial removal of carbonaceous compounds by the facultative anaerobes in the anoxic and microaerophilic zones, contributing to the increased rate of contaminant removal while reducing the energy costs associated with oxygen consumption.
- Low ratio of feed to the circulating liquid, implying that the feed is rapidly diluted and mixed with the mixed liquor, thereby ensuring maximum resistance to shock loads.
- Denitrification of the produced nitrates and nitrites shortly after their formation, preventing the accumulation of these inorganic contaminants that may exert inhibitory effects on microbial metabolism.

The hydraulic retention time of mixed liquor in the aerobic zone is controlled by adjusting the number of gates 11 between the aerobic zone 2 and microaerophilic zone 3, the size of apertures in the gates, and the input power of air compressor 9. Exemplary dimensions of the treatment system and the corresponding operating conditions are presented in Table 1.

The aerobic zone 2 contains solid support material 8 in the form of loose carriers or stationary objects of natural or artificial origin to support the attachment and growth of microbial biomass and the formation of microbial biofilm. The biofilm retains a relatively high biomass concentration of various trophic groups and ensures the growth and proliferation of slow-growing microorganisms, notably the autotrophic microorganisms that carry out the nitrification process and are essential for the biological removal of nitrogen. The retention of nitrifying microorganisms in the treatment system has posed a challenge to many wastewater treatment systems, especially those that only use suspended-growth microorganisms. The solid support material 8 should preferably have a non-clogging nature and should not unduly affect the liquid flow pattern. In fact, the presence of support material may increase the availability of oxygen to microorganisms by delaying the rise of oxygen through the system. The support material is preferably placed at the lower half section of the aerobic zone near the air diffusers where the dissolved oxygen concentration is at its highest value. This will support the optimum growth and proliferation of nitrifying bacteria that are sensitive to the concentration of dissolved oxygen, ensuring an efficient nitrification. The removal of ammonium ions that results from the nitrification process enhances the settleability of solids since ammonium is a monovalent cation and its presence deteriorates the settling properties of biosolids.

The design of the aerobic zone in the present invention that includes the presence of both suspended-growth and attached-growth microorganisms is expected to result in a higher solid retention time and sludge age in the treatment system compared to the prior art. In addition, the retention of nitrifying bacteria implies that the wastewater can be treated stably during the winter season when the activity of nitrifying bacteria is lower. Therefore, the treatment system of the present invention offers the benefits of both suspended-growth as well as attached-growth microbial systems. They include homogeneity of microbial environments in each zone, increased mass transfer rates of oxygen, nutrients and metabolic products across the cellular membrane, accumulation of a diverse population of microorganisms at high concentrations, low production of sludge, increased microbial adaptation, as well as increased specific and volumetric biodegradation rates. Examples of the support material include, but are not confined to, rocks, wood chips, plastic material, and pumice.

Figure 5:
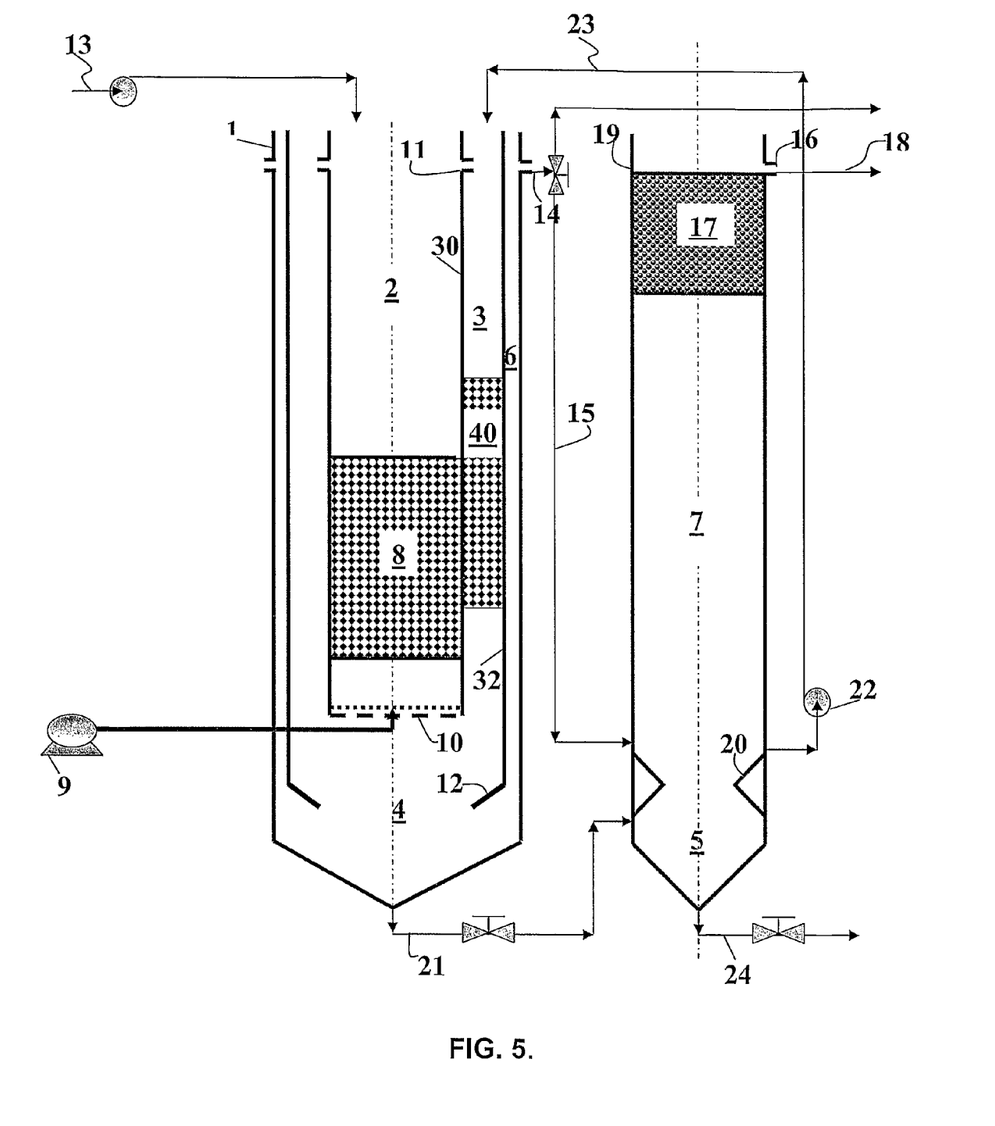
FIGS. 5, 6, 7, and 8 represent alternative embodiments of the wastewater treatment system of the invention.

The aerobic biological processes for the biodegradation of contaminants take place in the aerobic zone. These processes include the hydrolysis of high-molecular weight, long-chain organic compounds and their conversion into low-molecular weight compounds, followed by the degradation of low-molecular weight compounds by aerobic biological processes and their subsequent transformation into mostly carbon dioxide and water. The heterotrophic microorganisms degrade the carbonaceous compounds while the autotrophic microorganisms carry out the nitrification process for the conversion of ammonia nitrogen to nitrate. The transformation of nitrate to molecular nitrogen for the complete removal of nitrogenous compounds takes place in the microaerophilic and anoxic zones. Dissolved oxygen concentration diminishes within the length of the microaerophilic zone 3 and assumes values near zero at the bottom of this zone. The establishment of low dissolved oxygen concentrations in the microaerophilic zone 3 may be enhanced by placing solid support material in the form of loose carriers or stationary objects of natural or artificial origin in the entire volume or a part of this zone to support the formation of microbial biofilm. This arrangement is an alternative version of the present invention as illustrated in FIG. 5. The support material 40 should be non-clogging and should not unduly affect liquid circulation. The concentration of dissolved oxygen diminishes within the thickness of the biofilm layer which promotes denitrification.

The presence of immobilized biomass aids a rapid recovery of treatment in case of toxic shocks or biological upset and impedes the wash out of microbial cells. The accumulated biomass typically contains a mixed population of microorganisms, facilitating the simultaneous removal of carbonaceous and nitrogenous compounds. An additional advantage of biomass accumulation is an increase of high mean cell residence time (MCRT), also referred to as the solid retention time (SRT) that enhances microbial adaptation to the components in wastewater, thus improving their biodegradation ability and increasing the rate of biodegradation. Adapted microbial cells also have a higher tolerance to the potential toxins in the wastewater and maintain high degradation capacities for the substrate at higher inlet concentrations.

It is desirable, according to the present invention, to maintain a high concentration of microbial biomass at an optimum mean cell residence time (MCRT). A high mean cell residence time (MCRT) and a high concentration of microbial biomass are desirable in wastewater treatment systems to ensure high specific and volumetric biodegradation rates of contaminants. However, the mean cell residence time should be maintained within an optimum range in order to prevent the aging of biomass and the associated deterioration of its physiological activities and settling capacity. In the system of the present invention, the mean cell residence time (MCRT) can be controlled by adjusting the output power of air blower that controls the magnitude of the forces exerted on the solid particles in the mixed liquor. The adjustment of air blower's output power serves to control liquid circulation and enables, through an increased settling opportunity, the occasional removal of a part of microbial cells, thus preventing the accumulation of old and less efficient cells and ensuring the maintenance of a high concentration of active microbial biomass in the circulating mixed liquor.

When operated at optimum conditions, the system of the present invention should result in a reduced production of biological solids or sludge compared to conventional aerobic treatment technologies. The reduced amount of sludge produced during the treatment process is due to a low cell growth, sloughed-off biofilm, occasional removal of biomass to control its retention time, and precipitation of high-density flocs to the bottom of the tank wherein the sludge is partly digested and stabilized in the anaerobic zone 5 (of the second tank 19). The remaining sludge can be transferred by pipes or tubes 24 out of the second tank 19 and may be further concentrated in a sludge concentrator placed downstream from the second tank 19. The design of the present invention is thus expected to prevent the generation of excessive biological sludge and produce a reduced amount of sludge compared to the prior art. In addition, the design of the invention aims to ensure the retention of a high concentration of active biomass in both suspended as well as attached form in the biological treatment zones.

The solids are separated from the liquid in two clarification zones. The first zone 6 is adjacent to the microaerophilic zone 3 while the second zone 7 is physically separated from the first clarification zone and acts as a back-up clarifier in the event of biological upset or whenever the quality of effluent emerging from the first tank does not conform to the treatment criteria. While mixed liquor continuously circulates between the three zones of the system, a fraction of liquid freely flows towards the clarification zone 6 that is adjacent to the microaerophilic zone 3 and leaves the system in accordance with the laws of continuity since there is no liquid accumulation in the system. As the liquid flows upward in the first clarification zone 6, the solid material flows downward and precipitates to the bottom of the anoxic zone 4. The effluent emerging from the first clarification zone 6 will be assessed by turbidity probes (not illustrated) that are placed in the effluent line 14 to determine its turbidity. In the event of a poor quality of effluent, it can be directed through line 15 towards the second clarification (solid-liquid separation) unit (zone) 7 that is housed in the second tank 19. Here, the remaining solid material will precipitate to the anaerobic zone 5 while liquid flows towards the exit port of the system 16. The liquid passes through a filtration unit 17 located at the top of the second tank 19 to retain the fine suspended solids and remaining colloidal material, ensuring the emergence of a relatively clear effluent 18 from the treatment system. The filtration unit contains packing material such as activated carbon, peat moss and sand. Baffles 20 inside the solid-liquid separation unit 7 facilitate the separation of solids from the liquid and prevent the rise of sludge that is accumulated at the bottom of the tank.

Figure 6:
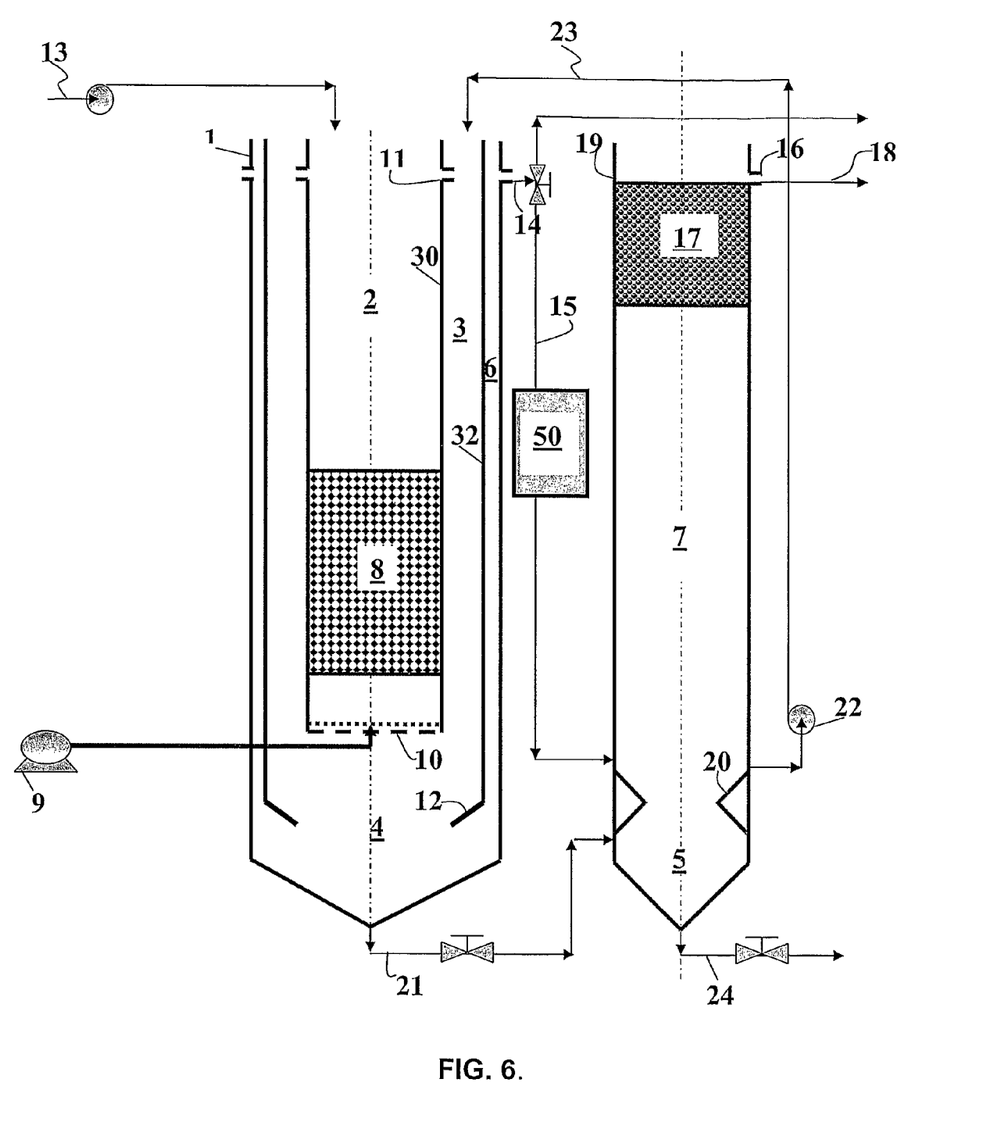

In an alternative embodiment of the invention, a treatment unit may be added to the treatment system of the present invention to enhance the removal of phosphorus from the effluent and for the increased settleability of suspended solids. The treatment unit may employ chemical coagulation, or if phosphorus removal is not an issue, a technique selected from ozonation, ultrasound treatment and pulsed electric fields. In the embodiment illustrated in FIG. 6, the effluent leaving the first tank 1 will pass through a chemical coagulation treatment unit 50 before entering the second tank 19. This provision aims to ensure continued treatment at a relatively high efficiency in case of toxic shock or during the periods of operation upset. If chemical coagulation system is used, the chemicals may be for example iron and/or aluminum salts.

The solids accumulated at the bottom of the anoxic zone 4 can be transferred by pipes 21 to the anaerobic zone 5 on an intermittent basis, a few times daily. The anoxic zone 4 supports the growth and proliferation of facultative anaerobic bacteria that are involved in the denitrification and phosphorus removal processes and contribute to the removal of COD and BOD. This zone, typically, partly digests and solubilizes the high-molecular weight and particulate solid material and produces volatile fatty acids (VFAs) by fermentation processes. These compounds, mainly propionic, butyric and acetic acids are low molecular-weight fatty acids that are easily degradable and may be used as the source of carbon by the denitrifying bacteria during the nitrate reduction processes that take place in the microaerophilic and anoxic zones. The anoxic zone also conditions the mixed liquor during each cycle of mixed liquor circulation, improving bioflocculation capacity of microbial biomass and the subsequent settleability of solids. The anaerobic zone further digests and solubilizes the accumulated solids and produces additional volatile fatty acids (VFAs) by fermentation processes. The VFAs produced in the anaerobic zone are transferred by a pump 22 in a recycle stream 23 to the top of microaerophilic zone 3 to be mixed with the mixed liquor. This action likely eliminates the need for the addition of an external carbon source for the denitrification processes, a common practice in conventional wastewater treatment systems, thus avoiding additional costs. The VFAs produced in the anoxic zone 4 and anaerobic zone 5 are also uptaken by the phosphorus accumulating organisms (PAOs) and they are further converted to polyhydroxyalkanoates (PHAs) that are stored in the intracellular spaces of the microorganisms as the source of carbon and energy for the subsequent phosphorus accumulation process that is carried out in the aerobic zone. The transfer of PAOs to the aerobic zone takes place via the recycle conduit 23 that discharges into the circulating mixed liquor at the top of the microaerophilic zone 3. The phosphorus accumulated in the intracellular spaces of microbial biomass will then be discharged from the treatment system with the waste sludge. Furthermore, the anaerobic zone 5 is typically the place for sludge stabilization where the population of disease-causing pathogenic microorganisms and the organic content of the sludge are reduced.

Figure 7:
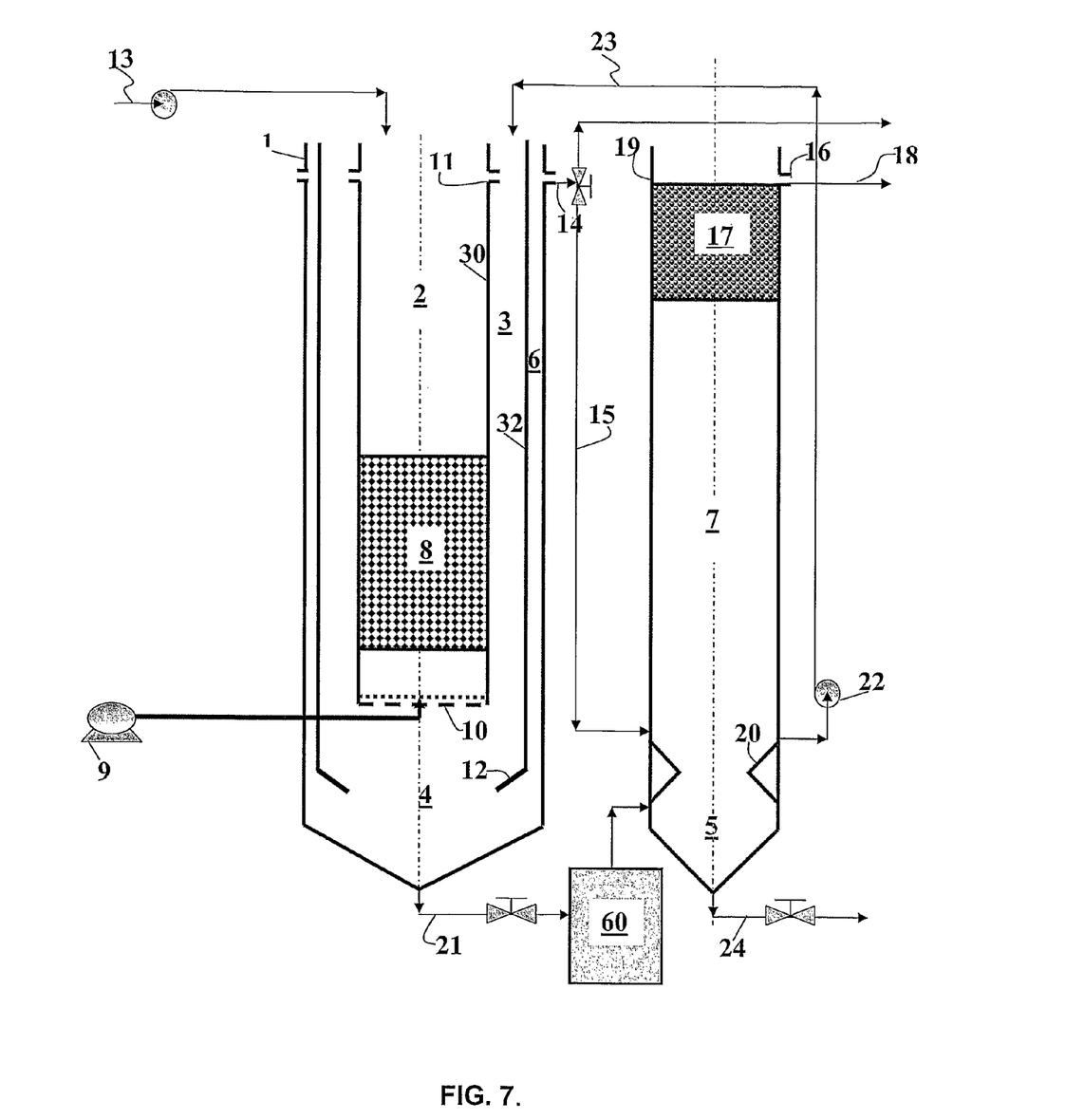

As an alternative embodiment, the treatment system of the present invention may include a sludge pre-treatment unit between the anoxic and anaerobic zones as presented in FIG. 7. In this embodiment, the biosolids removed from the anoxic zone will be largely disintegrated in the sludge pre-treatment unit 60 in order to produce more easily degradable organic matter and to improve their further degradation and stabilization in the anaerobic zone. The disintegration techniques include but are not limited to, thermal oxidation, chemical digestion, ozonation, ultrasound treatment, pulsed electric fields, enzymatic treatment and high pressure homogenizer.

Figure 8:
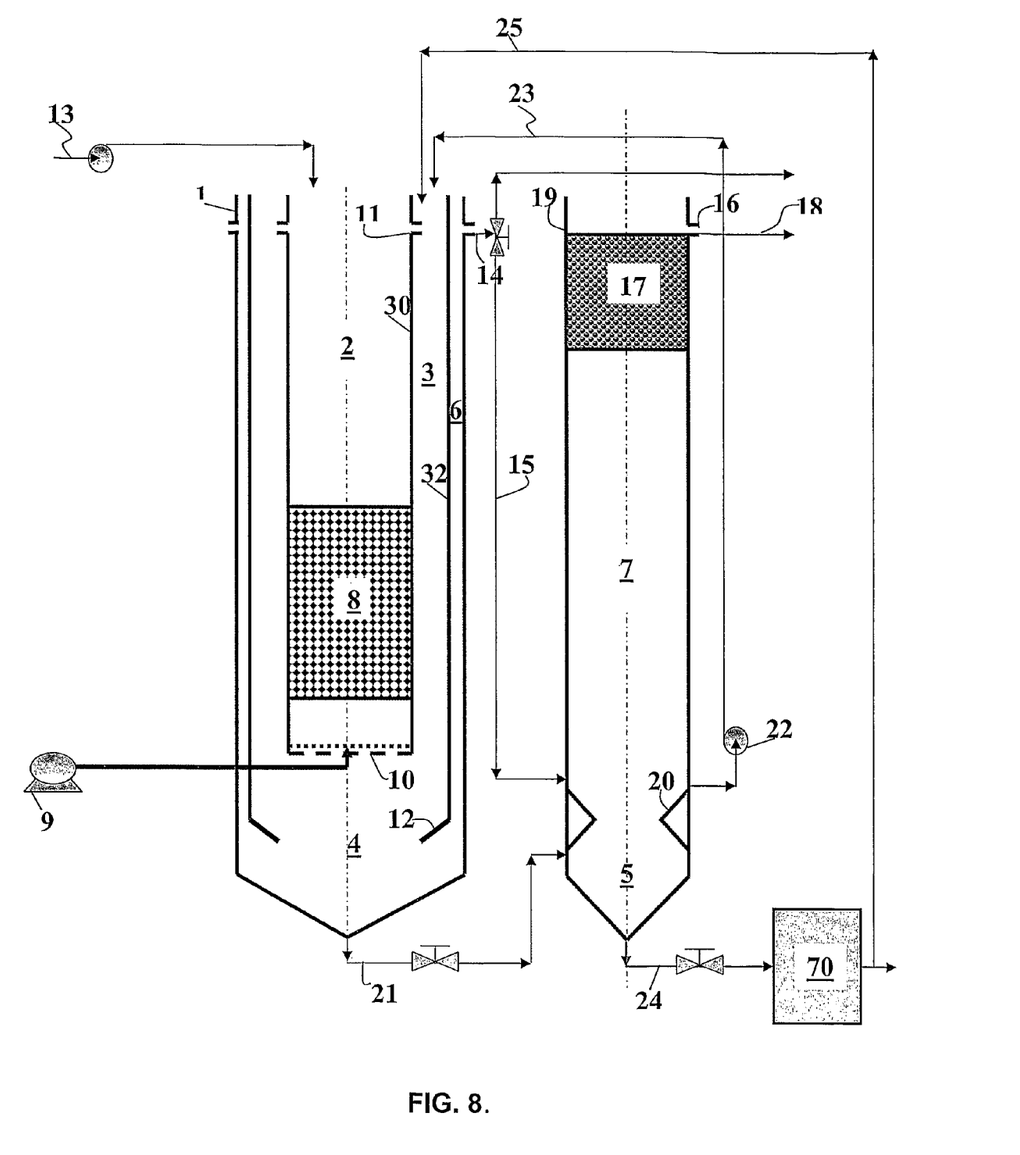

In another alternative embodiment of the invention, the treatment system may include a solid disintegration unit after (downstream) the anaerobic zone as presented in FIG. 8. In this version, the biosolids removed from the anaerobic zone will be further disintegrated in the solids disintegration unit 70 in order to solubilize all or part of the biosolids and to produce more easily biodegradable organic matter. The solubilized organic material produced in the solid disintegration unit 70 may be entirely sent to a storage tank for further processing or a fraction of it may be sent back by a recycle stream 25 to the top of the microaerophilic zone to be mixed with the mixed liquor. The disintegration techniques include, but are not limited to, thermal oxidation, chemical digestion, ozonation, ultrasound treatment, pulsed electric fields, enzymatic treatment and high-pressure homogenizer.

TABLE 1

Example of dimensions and operating conditions of the treatment plant

| Parameter | Dimension |
|---|---|
| Diameter of aerobic zone (m) | 1.2 |
| Diameter of microaerophilic zone (m) | 2.0 |
| Overall bioreactor diameter (m) | 2.2 |
| Height of aerobic zone (m) | 4 |
| Height of clarification zone (m) | 4 |
| Influent flow rate (m$^3$/d) | 5.3 |

The invention claimed is:

1. A wastewater treatment system comprising:
   a) a first processing vessel with inlet for receiving wastewater to be treated comprising:
      (i) an aerobic zone;
      (ii) at least one oxygen-depleted zone in communication with the aerobic zone;
      (iii) an aerator for introducing air or oxygen-containing gas into the aerobic zone;
      (iv) said aerobic zone, said oxygen-depleted zone, and said aerator being arranged such that the introduced air or oxygen-containing gas causes circulation of wastewater through the aerobic zone and the at least one oxygen depleted zone; and
      (v) a first clarification zone in communication with the at least one oxygen-depleted zone; and
   b) a second processing vessel separate from said first processing vessel comprising an anaerobic zone in a lower part thereof;
   c) first passage for permitting the transfer of material from the at least one oxygen-depleted zone to the anaerobic zone of said second processing vessel; and
   d) an outlet for processed wastewater.

2. The system according to claim 1 wherein the second vessel comprises a second clarification zone in an upper part of the second vessel, a second passage establishes communication between the first clarification zone and the second clarification zone.

3. The system according to claim 1 wherein the at least one oxygen-depleted zone comprises a microaerophilic zone and an anoxic zone.

4. The system according to claim 1 wherein the aerobic zone includes a solid support for attachment of microbial biomass.

5. The system according to claim 3 wherein the anoxic zone is disposed below the aerobic zone.

6. The system according to claim 2 wherein a filtration layer is disposed in the clarification zone of the second vessel.

7. The system according to claim 1 further comprising a third passage and pump for establishing communication between the second clarification zone and the at least one oxygen-depleted zone.

8. The system according to claim 1 wherein the anaerobic zone has an outlet passage.

9. The system according to claim 8 wherein a solids disintegration unit is connected to the outlet passage for the contents of the anaerobic zone to pass therethrough.

10. The system according to claim 8 wherein the outlet passage establishes communication between the anaerobic zone and the at least one oxygen-depleted zone.

11. The system according to claim 1 further comprising a sludge pre-treatment unit disposed in the first passage downstream of the first vessel, the sludge pre-treatment unit being one of the group consisting of thermal oxidation unit, chemical digestion unit, ozonation, ultrasound treatment, pulsed electric field, enzymatic treatment and high-pressure homogenizer unit.

12. The system according to claim 9 wherein the disintegration unit is one of the group consisting of thermal oxidation, chemical digestion, ozonation, ultrasound treatment, pulsed electric fields, enzymatic treatment and high pressure homogenizer.

13. The system according to claim 3 wherein the microaerophilic zone is disposed annularly around the aerobic zone.

14. The system according to claim 2 further comprising a treatment unit installed in the second passage downstream of the first vessel, the treatment unit selected from the group consisting of chemical coagulation unit, ozonation, ultrasound treatment and pulsed electric field unit.

15. The system according to claim 3 wherein the microaerophilic zone comprises a solid support for attachment of bacterial biomass.

16. The system according to claim 1, wherein the aerator comprises an arrangement of air diffusers.

17. A wastewater purification process comprising the steps of:
   feeding wastewater into a first processing vessel having an aerobic zone, a microaerophilic zone and an anoxic zone while providing aerobic conditions in said aerobic zone such that the wastewater circulates through the aerobic zone, the microaerophilic zone and the anoxic zone, providing solid support for microbial biomass in said aerobic zone, feeding part of the contents of the anoxic zone to an anaerobic zone in a second processing vessel to permit sludge present in said contents to settle in the anaerobic zone, removing effluent from the first processing vessel, and removing any sludge settled in the anaerobic zone of the second processing vessel.

18. The process according to claim 17 further comprising the steps of: feeding part of the effluent removed from the first vessel into a clarification zone formed above the anaerobic zone in the second vessel, and removing effluent from the clarification zone.

19. The process according to claim 18 wherein the effluent from the clarification zone is filtered in the second vessel before removal.

20. The process according to claim 17 wherein part of the effluent removed from the first vessel is subjected to a treatment selected from the group consisting of chemical coagulation, ozonation, ultrasound treatment and pulsed electric fields, before feeding the effluent into the clarification zone in the second vessel.

21. The process according to claim 17 wherein the contents of the anoxic zone are pretreated before feeding to the anaerobic zone, the pretreatment being effected by a technique selected from the group consisting of thermal oxidation, chemical digestion, ozonation, ultrasound treatment, pulsed electric field, enzymatic treatment and high-pressure homogenization.

22. The process according to claim 17 wherein contents of the second vessel are recycled to the first vessel.

23. The process according to claim 17 wherein part of the sludge removed from the anaerobic zone is recycled to the microaerophilic zone.

24. The process according to claim 23 wherein the recycled sludge is subjected to a disintegration operation, the operation selected from the group consisting of thermal oxidation, chemical digestion, ozonation, ultrasound treatment, pulsed electric field, enzymatic treatment and high-pressure homogenization.

25. A wastewater treatment system comprising:
an aerobic zone;
one or more oxygen-depleted zones in communication with said aerobic zone;
an aerator for supplying oxygen-containing gas to said aerobic zone, said aerobic zone and said one or more oxygen-depleted zones being arranged such that operation of said aerator causes introduced wastewater to circulate through said aerobic zone and said one or more oxygen-depleted zones;
an anaerobic zone in a separate vessel isolated and apart from said aerobic zone and said one or more oxygen-containing zones; and
a passage for permitting the transfer of part of the contents of said one or more oxygen-depleted zones to said anaerobic zone.

26. A wastewater treatment system as claimed in claim 25, wherein said one or more oxygen-depleted zones in communication with said aerobic zone include a microaerophilic zone and an anoxic zone.

27. A wastewater treatment system as claimed in claim 26, wherein said anoxic zone is disposed vertically below said aerobic zone, and said microaerophilic zone surrounds at least said aerobic zone.

* * * * *